# United States Patent

Binks

[15] 3,697,758
[45] Oct. 10, 1972

[54] PINHOLE DETECTOR WITH INTERNAL LIGHT SHIELD ASSEMBLY

[72] Inventor: Melvin J. Binks, 410 West Russell, Barrington, Ill. 60010

[22] Filed: April 13, 1971

[21] Appl. No.: 133,511

[52] U.S. Cl. ............250/202, 250/219 DF, 250/237
[51] Int. Cl. .........G01n 21/32, G05b 1/00, H01j 3/14
[58] Field of Search.................250/202, 219 DF, 237

[56] References Cited

UNITED STATES PATENTS 3,422,272   1/1969   Brosious et al. ......250/219 DF

Primary Examiner—James W. Lawrence
Assistant Examiner—T. N. Grigsby
Attorney—Davis, Lucas, Brewer & Brugman

[57] ABSTRACT

A light source is directed toward an elongated aperture in a scanner housing. A light-sensitive optical system within the housing generates a signal in response to light passing through a hole in a strip moving across the aperture. A light guide in the aperture consists of a louver-like array of light transmitting elements or channels. The light guide transmits only light received in a direction parallel to a plane which is substantially vertical and substantially parallel to the line of movement of the strip. A concealed, elongated edge light shield is supported within the housing, between the light guide and the pinhole-detecting, light-sensitive, optical system. An auxiliary light-sensitive element is carried by the inner end portion of the edge light shield in position to receive light passing through to the light guide at the edge of the strip. A drive motor and control automatically move the edge light shield along the aperture inside the scanner housing in response to a signal from the auxiliary light-sensitive element; this maintains the light-sensitive element vertically aligned with the edge of the strip, and prevents the transmission of light into the housing through that portion of the light guide beyond the edge of the strip.

24 Claims, 22 Drawing Figures

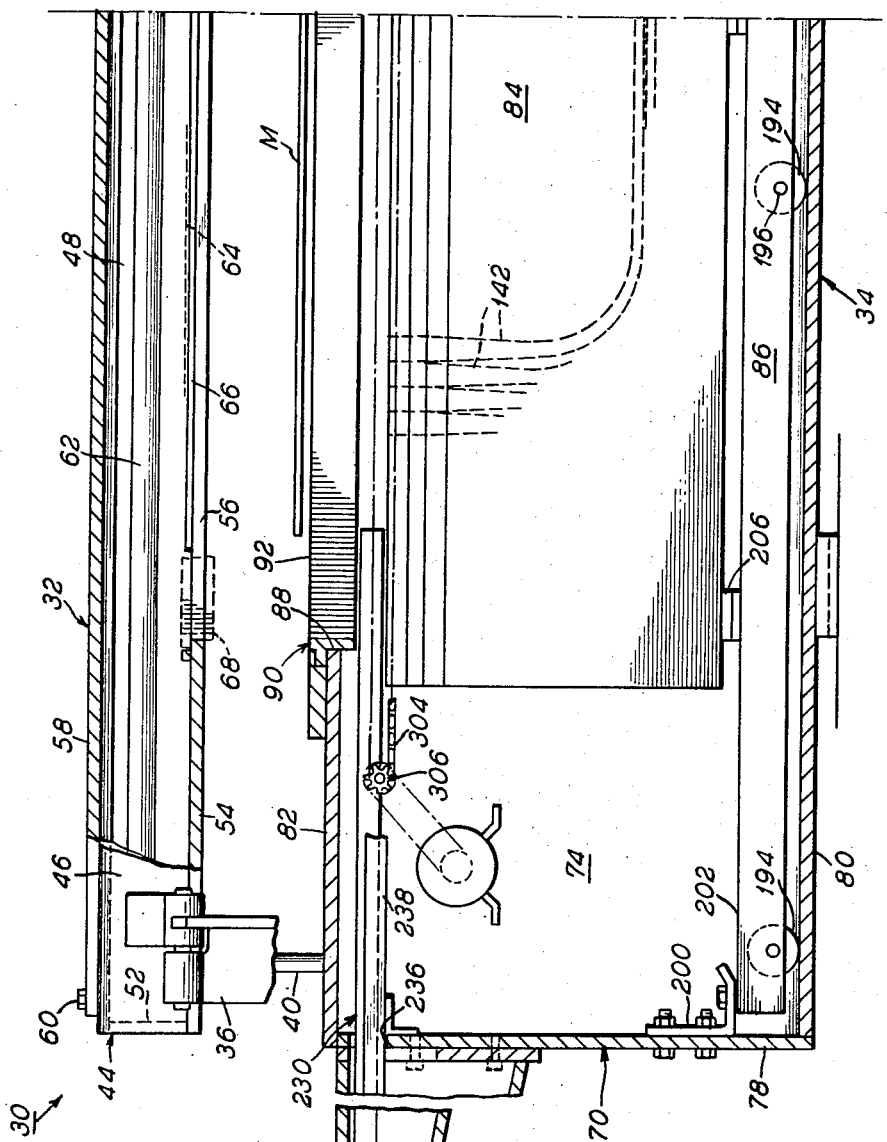
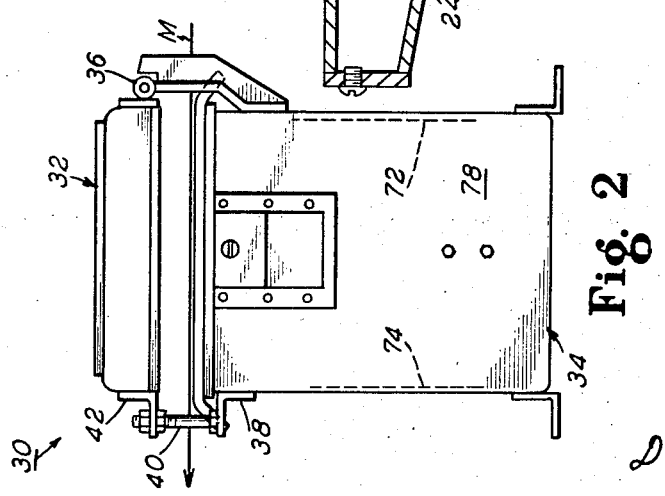
Fig. 1
Fig. 2
INVENTOR
Melvin J. Binks
BY
Davis, Lucas, Brewer & Brugman
ATTORNEYS INVENTOR
Melvin J. Binks
BY
Davis, Lucas, Brewer & Brugman
ATTORNEYS

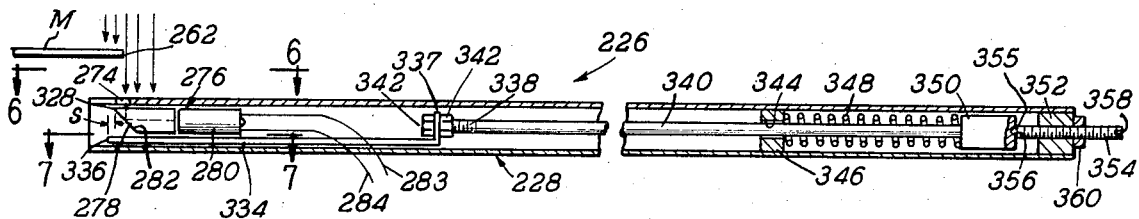
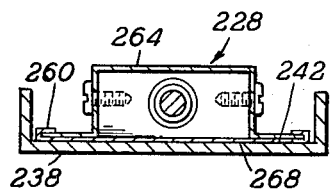
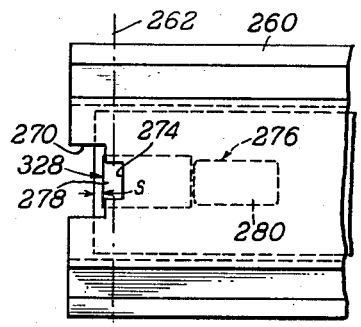
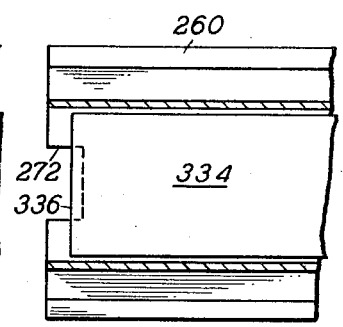
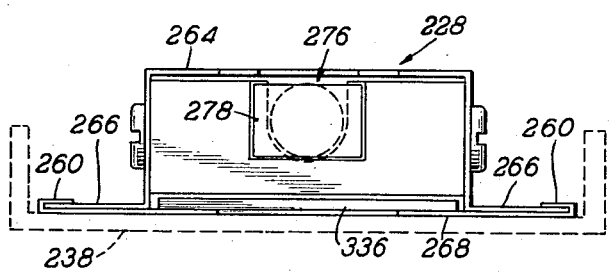
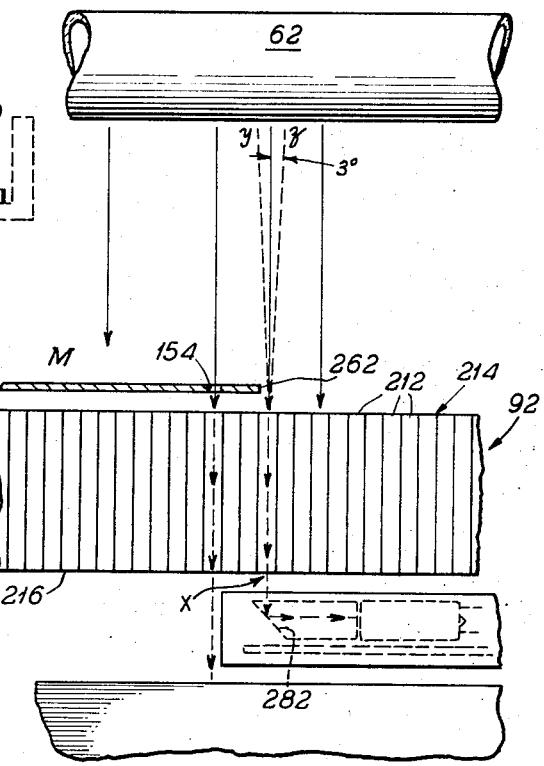
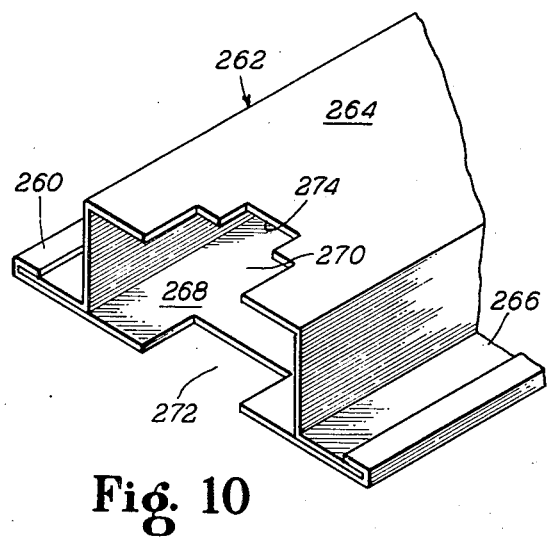

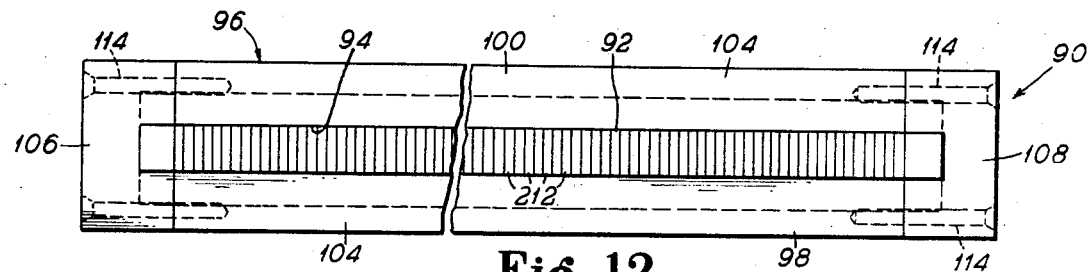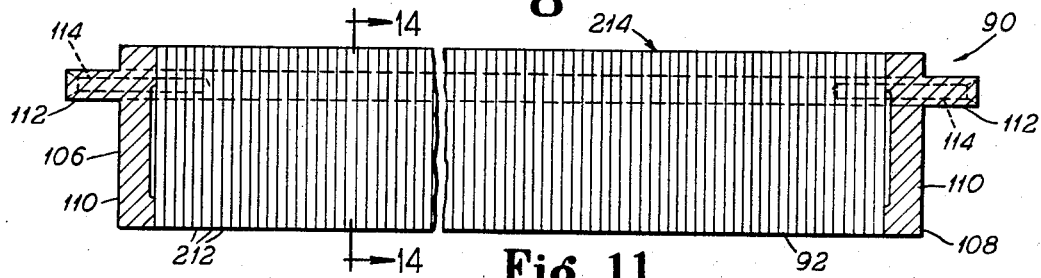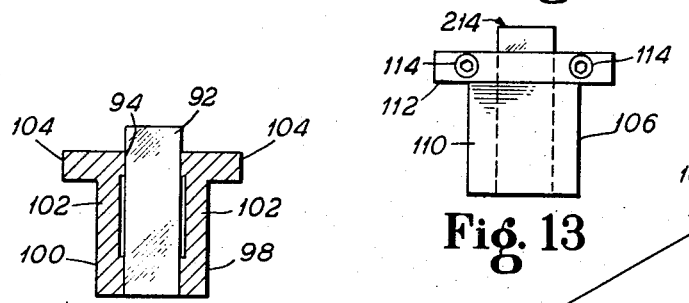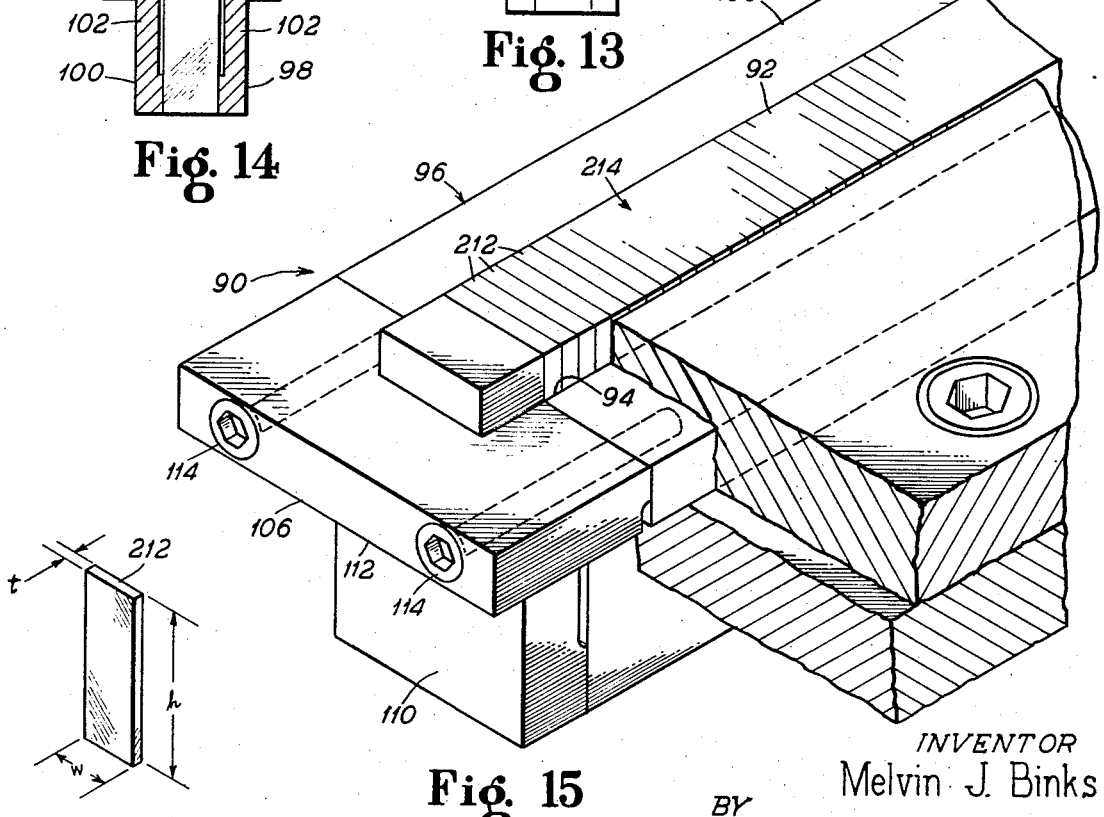

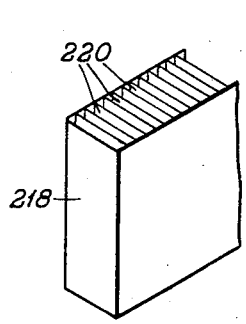
Fig. 17
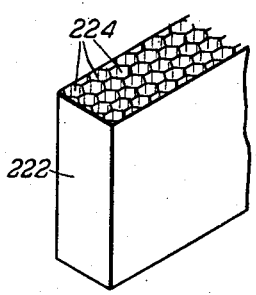
Fig. 18
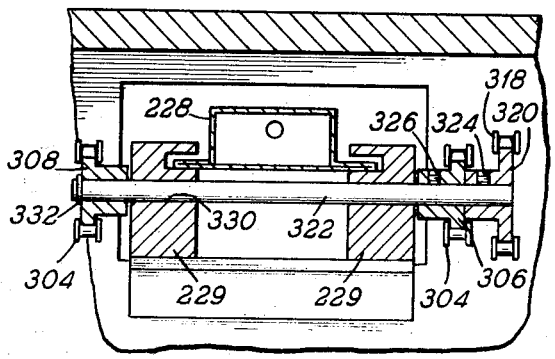
Fig. 19
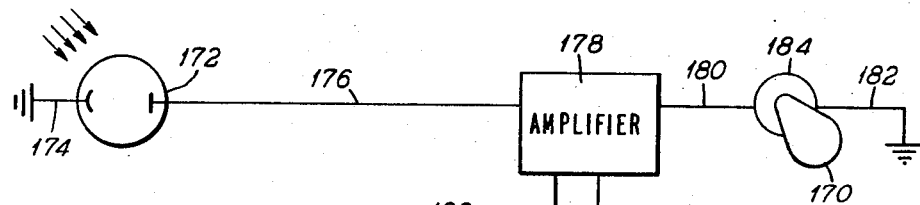
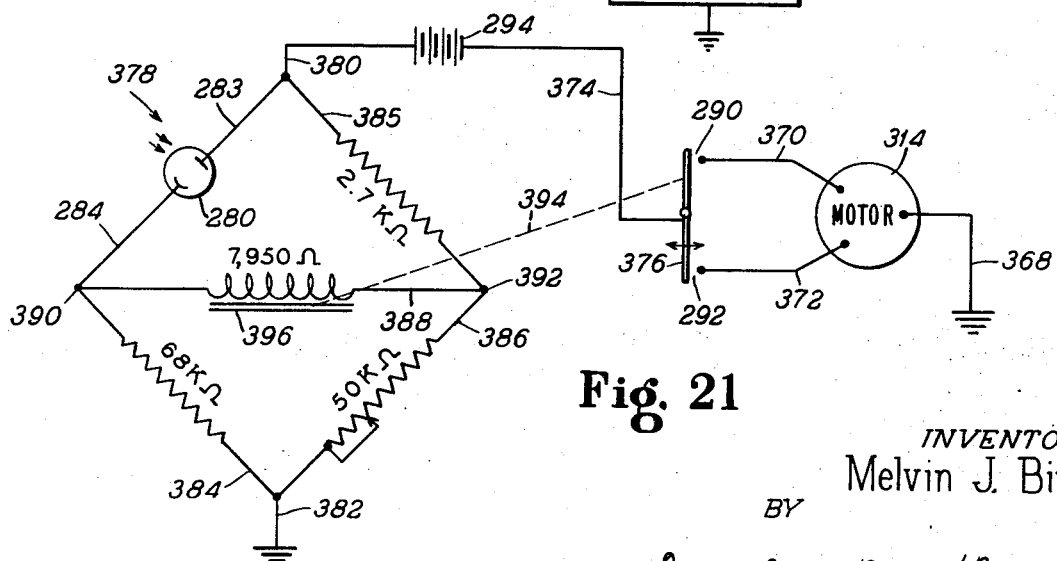
Fig. 20
Fig. 21
INVENTOR
Melvin J. Binks
BY
Davis, Lucas, Brewer & Brugman
ATTORNEYS

PINHOLE DETECTOR WITH INTERNAL LIGHT SHIELD ASSEMBLY

BACKGROUND OF THE INVENTION

The field of this invention is generally a hole detector for a moving sheet or strip, commonly referred to as a pinhole detector, and is of the class generally associated with Patent Office Classification No. 250.

Pinhole detectors are widely used for inspecting continuous strip material, such as electrolytically tinned tin plate. They are used to sense the presence of small imperfections such as holes, cracks, and other flaws in the continuous strip, in the various phases of processing tin plate. Examples of pinhole detecting devices are illustrated in U.S. Pat. No. 3,125,682, issued Mar. 17, 1964, to G. B. Linderman, et al; U.S. Pat. No. 3,240,945, issued Mar. 15, 1966, to C. Dickson; and U.S. Pat. No. 3,341,709, issued Sept. 12, 1967, to Melvin J. Binks.

Tin plate is manufactured and processed in strips and sheets which may move at 5,000 or more feet per minute. Inspection apparatus must detect holes of 1 mil, or less, at these speeds; it is apparent therefore that pinhole detecting devices must be precision equipment. Further, the strip may weave from side to side, its width may change during continuous operation, and it may pulsate vertically. The problem of insulating the photosensitive optical system of a pinhole detecting device from unwanted light, both ambient light and light reflected from the pinhole detecting device light source, is a serious one.

In conventional pinhole detectors, the edge light shields are exposed to the strip and have a narrow vertical gap through which the edge of the strip runs. This gap is defined by wearing elements which are contacted by the strip from time to time. Should a bent up corner from an edge crack on the strip, or a bad weld, hit one of these wearing elements, the strip can be torn entirely across, shutting down the line. In heavy-gauge strip, "pie crust" edges can also severely damage these conventional, exposed, light shields. There have been occasions when careless operators have run the strip on top of one of the light shields instead of through the gap.

Another problem, in conventional pinhole detectors, is that the photo-sensitive elements which sense the edge of the strip are exposed to the atmosphere and collect dirt. This requires frequent cleaning for continued, dependable operation.

SUMMARY OF THE INVENTION

It is therefore an object of the present invention to provide a pinhole detector having an edge light shield which is contained within a scanner housing and which is therefore completely out of engagement with a moving strip being inspected.

It is a further object of this invention to provide, in a pinhole detector, novel means for varying the width of an unscanned edge portion of the moving strip in applications where it is desired to disregard flaws in an edge portion which is subsequently to be trimmed off and discarded.

BRIEF DESCRIPTION OF THE DRAWINGS

Still other objects and advantages of this invention will become apparent from the following description taken in connection with the drawings, in which:

FIG. 1 is an elevation, partly in section, illustrating the left side portion of a pinhole detector incorporating a preferred form of the present invention, and seen looking in the direction of movement of a strip M;

FIG. 2 is an end view of FIG. 1;

FIG. 4 is a fragmentary vertical cross-section of FIG. 1A taken along the line 4—4;

FIG. 5 is a fragmentary enlarged view of FIG. 1A showing details of one of the edge light shields and its transverse relationship to the edge of the moving strip M;

FIG. 6 is a fragmentary enlarged view of the leading, inner end portion of the edge light shield of FIG. 5 taken in the direction of the arrows 6—6;

FIG. 7 is a fragmentary enlarged sectional view of FIG. 5 taken along the line 7—7;

FIG. 8 is a fragmentary enlarged elevational view of the leading, inner, open end of the edge light shield shown in FIG. 5;

FIG. 9 is a fragmentary enlarged view of FIG. 5, with additional, cooperating portions of the apparatus;

FIG. 10 is a fragmentary perspective view of the leading, inner end portion of one of the edge light shields;

FIG. 11 is a fragmentary enlarged view of FIGS. 1 and 1A showing a light aperture assembly which is an important part of the present invention;

FIG. 12 is a plan view of FIG. 11;

FIG. 13 is a right-hand end view of FIG. 11;

FIG. 14 is a vertical cross-sectional view of FIG. 11 taken along the line 14—14;

FIG. 15 is an enlarged fragmentary, perspective view of FIG. 11 together with certain adjacent components;

FIG. 16 is a perspective view of one of the light-guiding elements shown in FIG. 15;

FIGS. 17 and 18 are modified forms of light guides;

FIG. 19 is an includes fragmentary, cross-sectional view of FIG. 1A taken along the line 19—19;

FIG. 20 is a schematic electrical diagram showing means for protecting the main photo tube light sensor from excessive light; and FIG. 21 is schematic electrical diagram showing a simplified servo circuit for moving one of the edge light shields automatically in response to transverse movement of the adjacent edge of the strip M.

Like parts are designated by like reference characters throughout the figures of the drawings.

DESCRIPTION OF THE PREFERRED EMBODIMENT

A pinhole detector illustrating a preferred embodiment of this invention includes a frame generally designated 30. It comprises light source means 32 pivoted on scanner means 34 by a pair of hinges 36.

Figure 3:
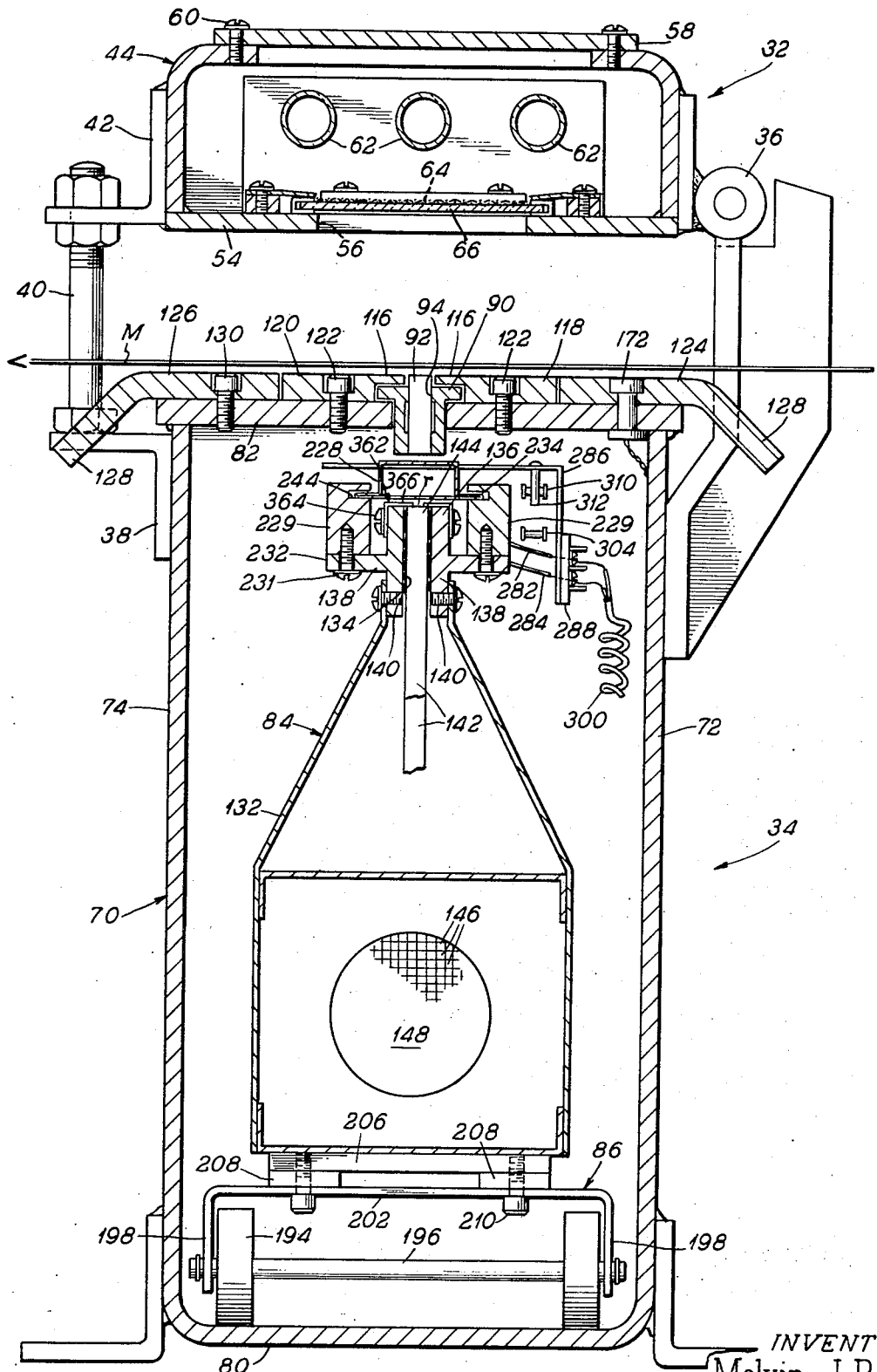
FIG. 3 is a fragmentary vertical cross-section of FIG. 1A, taken along the line 3—3.

A strip M of sheet material such as metal, which is being inspected, moves across the top of the scanner means 34 in a direction away from the observer in FIG. 1, and from right to left in FIGS. 2 and 3. A bracket 38 is supported by the scanner means 34 at the side opposite the hinges 36 and provides a stop for a bolt 40 fastened to bracket 42 on the light source means 32.

Light Source

The light source means 32 has an elongated housing 44 comprising side walls 46, 48, end walls 50, 52, a bottom wall 54 with an opening 56, and a removable top wall 58 held by bolts 60.

The light source itself comprises a plurality (in this case, three) of fluorescent lamps 62. The interior of the housing 44 will preferably have a white or reflective surface to direct light downward through the opening 56 across the width of the moving strip M. The lamps will be energized by a 4.5K Hz source of alternating current (not shown). This directs a band of high frequency light at 9,000 cycles per second across the strip M. A metal screen 64 may be provided across the opening 56 to retain and control this high frequency energy. A glass cover 66, in the opening 56, seals the interior of the light source housing 44.

Optionally, a light collimator 68 may be placed in the opening 56 to direct the light emitted by the lamps 62 in a substantially vertical direction. This may take the form of a louver or honeycomb.

Scanner Means

The scanner means 34 includes a main scanner housing 70 having longitudinal side walls 72, 74, end walls 76, 78, a bottom wall 80, and a top wall 82. The walls will be bolted or welded together in any suitable fashion and should be light-tight.

Within the main scanner housing 70 is a light-sensitive optical system generally designated 84 supported on a chassis 86.

The top wall 82 of the main scanner housing 70 has a slot 88 transverse to the line of movement of the strip M and is somewhat longer than the width of the strip. The slot extends sufficiently beyond both edges of the strip to allow for a normal amount of weave which may be as much as 4 inches toward either side. Although the strip M is shown centered, it will be appreciated that the apparatus is equally effective when the strip is off-center.

Light Guide Means

An important part of the invention is the construction and arrangement of light discriminating means shown in FIGS. 11–16, generally designated 90. This consists of an elongated, optical, light guide means or core 92, cemented or otherwise fixed within a light guide aperture 94 of a rectangular frame 96. The frame is secured in slot 88 by means which will be described.

As shown in FIG. 14, the frame 96 comprises a pair of side angle bars 98, 100, each having a vertical web 102 abutting the light guide means 92, and each having a horizontal flange 104. Relatively shorter angle bars 106, 108, with vertical webs 110 and horizontal flanges 112, are connected to the side angle bars 98, 100 by screws 114 (FIG. 12), forming a unitary frame assembly. The inner vertical surfaces of the vertical webs 102 and 110 define the periphery of the light guide aperture 94. Details of the light guide means 92 and modifications shown in FIGS. 17 and 18 will be described.

As shown in FIG. 3, the light discriminating means 90 is held by overlying flanges 116 of retainer strips 118, 120. The latter are fastened by screws 122 to the top wall 82 of the scanner housing 70. Deflector strips 124, 126, having downwardly inclined edge portions 128 are fastened by screws 130 to the top wall 82. The downwardly inclined edge portion 128 on the inbye side (the right-hand side in FIGS. 2 and 3) functions as an entry guide to prevent "hooking" of bent or discontinuous edges of strip M. The top surfaces of the retainer and deflector strips 118, 120, 124 and 126, are in substantially the same horizontal plane. They constitute a flat, planar working surface parallel to the strip M, and across which the strip travels during inspection.

Optical System

The light-sensitive optical system 84 has one or more photo-sensitive devices associated with it in a manner well known in the art and which therefore will be described only generally.

Briefly, the system 84 includes a light-tight housing 132 having a detection slot 134 vertically below and parallel to the light guide aperture 94. The detection slot 134 is defined by the inner vertical surfaces of head portions 136 of 132 by screws 140. Curved, tapered, light pipes 142, of suitable optical material such as acrylic plastic, have light-receiving end portions 144 within detection slot 134 and have light-emitting end portions 146 grouped in front of a phototube 148 and transmit light across the space 150 to the phototube. Housing bell 152 encloses a socket for the photo tube and portions of the control circuit therefor.

Assume there is a pinhole 154 (FIG. 9) in the strip M. Light will be transmitted from the lamps 62 to the photo tube 148, via the pinhole, the light guide core 92, and one or more of the light pipes 142. A conventional system to produce an output signal when light shines through such a pinhole is shown schematically in FIGS. 1 and 20. This includes a 120-cycle filter 156, a signal amplifier 158, a 9K Hz band pass filter 160 (when light of that frequency is produced by the lamps 62), a gain calibration adjustment unit 162, a supplemental signal amplifier 164, and a Schmitt trigger 166.

The resultant output signal, in conductor 168, may be employed to actuate a marking device (not shown) to indicate the location of the pinhole along the strip M. Such a marking device is illustrated in Binks U.S. Pat. No. 3,188,478 issued June 8, 1965. Alternatively, if the strip M is discontinuous, that is, in the form of individual sheets which are being inspected, the output signal in conductor 168 may be used to divert sheets, containing flaws, to a reject bin. Such a diverting apparatus is illustrated in Binks U.S. Pat. No. 3,528,094 issued Sept. 8, 1970.

Light Stop

Figure 1A:
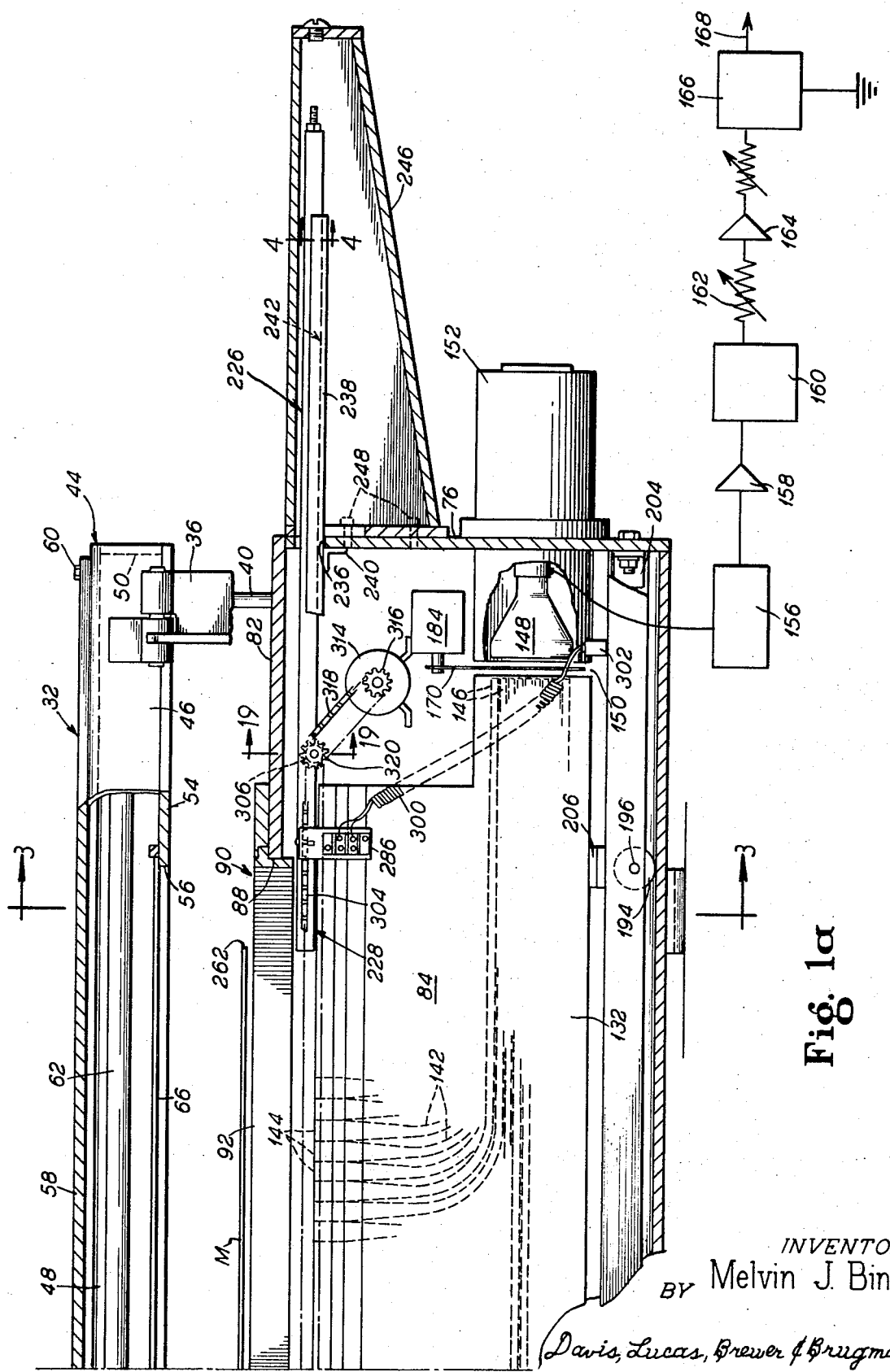
FIG. 1a is a view, similar to FIG. 1, illustrating the right side portion of the pinhole detector.

FIGS. 1a and 20 show a pivotal, blade-like light stop 170 which is operable in the space 150 to prevent light from the light pipes 142 entering the photo tube 148. The light stop 170 is automatically swung into the space 150 when no strip (or sheet) M is between the light source means 32 and the light guide means 92. When the strip or sheet M runs out, the photo tube 148 could be exposed to relatively intense light for a relatively long period, except for the stop 170. Such exposure would cause the photo tube 148, which is quite sensitive, to become highly emissive and to operate with a high noise level for hours. Because a high noise level would change the quantitative response of the photo tube, it should not be exposed to unnecessary light at excessive levels.

The light stop 170 may be actuated by one or more photoconductive cells 172 in the deflector strip 124 on the inbye side of the light guide aperture 94. The photo cell, or photo cells, 172 are much less responsive to light than the photo tube 148. The sensitivity of each photo cell 172 is such that the small amount of light transmitted through an ordinary pinhole or crack will not actuate it. Only direct, full exposure, as when no strip or sheet M is between the lamps 62 and the photocell 172, will cause a response. Each photo cell 172, will cause a response. Each photo cell 172 is grounded by a conductor 174, and is connected by a conductor 176 to an amplifier 178 which operates through conductor 180 and ground connection 182 to energize a rotary solenoid 184 to swing the stop 170 to closed position.

Coincident with closing the stop 170, an output signal inhibitor circuit, also shown in FIG. 20, shuts down the high voltage supply to the photo tube 148, and inhibits the output signal in conductor 168. This circuit is shown in Binks U.S. Pat. No. 3,528,094, so will not be described in detail. Briefly, an output conductor 186 from the amplifier 178 is fed to ground an element of the Schmitt trigger 166, above described. The Schmitt trigger is preferred because it can discriminate from normal circuit noise below a pre-set limit.

Input control is also provided for controlling the energizing supply to the photo tube 148, that is, the high voltage dynode supply 188 (FIG. 20). A relay 190, operated in response to signals from output conductor 192 of the amplifier 178, is connected to open the high voltage dynode supply circuit when activated, thereby de-energizing photo tube 148. Details of the relay 190 are described in Binks U.S. Pat. No. 2,528,094 issued Sept. 8, 1970.

Chassis

The housing 132 for the optical system is mounted on the wheeled chassis 86 inside the scanner housing 70. As shown in FIG. 3, the cross-section of the chassis is an inverted U-section. The chassis is supported on the bottom wall 80 of the scanner housing by three pairs of wheels 194 carried on shafts 196 supported between chassis side walls 198. The chassis 86 is fastened at one end by a bracket 200 bolted respectively to the chassis top wall 202 and the scanner housing end wall 78 (FIG. 1). At the opposite end, the chassis 86 is held by a pair of brackets 204 bolted respectively to the chassis side walls, 98 and to the scanner housing end wall 76 (FIG. 1a).

Refer to FIGS. 1, 1a and 3. A plurality (in this case, three) of transverse reinforcing bars 206 are fixed as by welding to the bottom of the optical housing 132. These are seated on annular, washer-like spacers 208, and the optical housing 132 and chassis 86 are fastened together by bolts 210 (FIG. 3).

Light Guide Means (Core)

Referring now more specifically to the embodiment of the elongated, optical light guide means designated 92, shown in FIGS. 11–16, it is a unitary core comprising a series of clear, acrylic, rectangular, plastic-block-like elements 212, each polished on all six faces, preferably before assembly. The elements 212 are separated by thin, opaque paper, or an opaque coating, and are glued together into a unitary side-by-side stack as shown. The long axes of the elements 212 are upright to guide light therethrough in substantially vertical planes parallel to the line of movement of the strip M. As an example of one set of specific dimensions which are effective in practicing the invention, each individual element 212 may have a height $h = 1 \frac{1}{8}$ inches; a width $w = $ three-eighths inch; and a thickness $t = $ 0.087 inch. After assembly and gluing, as aforesaid, the elements 212 will constitute a unit, completely filling the light guide aperture 94 (FIG. 3).

The core comprising the light guide means 92 functions as a unique kind of collimator in which the core screens out and blocks the transmission of light which shines on the top surface 214 of the core at any significant angle of incidence in a vertical plane which is transverse to the line of travel of the strip M; yet the core 92 does not block the transmission of light shining on the top surface 214 at a significant angle of incidence in a vertical plane which is parallel to the line of travel of the strip M.

Referring to FIG. 9, the "sight" from a point $x$ on the bottom surface 216 of the core 92, looking upward through one of the elements 212, is relatively limited, in a sidewise direction, to that portion of the surface of the lamps 62 between the points "y" and "z".

In other words, considering the transmission through one element 212 in FIG. 9, light transmitted by the lamps 62 to the point x at the inner surface of the core 92 is limited to that originating between the points "y" and "z" on the lamp surfaces. This would limit the major part of the light that passes through any one element 212, if dimensioned according to the example given above, to that having an angle of incidence of approximately 3° or less, as shown in FIG. 9. For all practical purposes, this means that the core 92 transmits only light which is in a vertical plane parallel to the direction of movement of the strip M. As will be seen this enables the apparatus to follow the edge of the strip M with extreme precision as it weaves from side to side, or changes width, in normal operation.

Instead of separating the individual acrylic elements 212 by opaque materials, such as paper or paint, another possibility would be to mirror the interfaces with reflective materials such as silver, aluminum or tin.

An alternative light guide core is designated 218 in FIG. 17. It comprises a series of horizontally spaced, thin, vertical louvers 220 of metal or fiber, parallel to the line of travel of the strip M. Another alternative, as shown in FIG. 18, would be to construct a light guide core 222 with a body consisting of vertical honeycomb elements 224. In both alternatives shown in FIGS. 17 and 18 the structural elements of the core may be separated by air or liquid, or may be filled with optical material such as acrylic plastic or glass.

All the light guide core embodiments shown in FIGS. 11–18 have in common the characteristic of preventing the transmission of light from the lamps 62 which strikes the top surface 214 of the light guide means 92 (or the top surface of core 218 or sore 222) at any substantial angle of incidence in a plane which is perpendicular to the strip M and normal to its line of movement. In other words, the light guide cores 92, 218 or 222, effectively transmit light from the lamps 62 only in a plane which is substantially normal to the strip M and which plane is substantially parallel to the direction of movement thereof.

Edge Light Shield Means

An important feature of the invention is that the space between the light source means 32 and the scanner means 34, is completely free of the edge light shields which are employed in conventional pinhole detectors.

In the present invention, two substantially identical edge light shield means 226 and 230 are provided, one for each edge of the strip M. These are separate and independent of each other, and are out of sight and out of the way, completely sealed within the scanner housing 70 and tail tube housings to be described. Because these edge light shield means 226 and 230 may be identical, except for obvious right- and left-hand considerations, only edge light shield means 226 (FIG. 1A) will be described in detail.

As shown in FIGS. 1a and 3, the right-hand edge light shield means, generally designated 226, is made up of several components including an elongated edge light shield 228.

As best shown in FIG. 3, means for supporting the shield 228 within the scanner housing 70 includes a pair of upstanding light shield support rails 229 fastened by screws 231 to horizontal webs 232 of T-rails 138. The support rails 229 have inwardly facing guide grooves 234, with bottom surfaces 244, which, as will be seen, support the inner end portion of the edge light shield 228 beneath, parallel to, and vertically coplanar with the light guide aperture 94.

The scanner housing end wall 76 has an opening 236 through which an elongated upstanding, U-section trough-like support 238 extends, this being held in place by a bracket 240 bolted respectively to the support 238 and to the inside of the wall 76. The bottom 242 of the support 238 is coplanar with and functions as an extension of bottom surfaces 244 of guide grooves 234 (FIG. 3) in the light shield support rails 229. A tail tube housing 246 is mounted on the outer face of scanner housing end wall 76, as by bolts 248.

Parts of the edge light shield means 230 (FIG. 1) which correspond to the parts just described for edge light means 226, are designated by the same reference numerals.

Refer now to FIGS. 5, 6, 7 and 8 for details of the edge light shield 228 which comprises part of the edge light shield means generally designated 226.

The edge light shield 228 is a tube having a rectangular cross-section and horizontal side flanges 260 which are slidable within grooves 234 in the light shield support rails 229 and upon the bottom 242 of support 238. As best shown in FIG. 8, the edge light shield 228 is a two-piece assembly consisting of a top, inverted U-section cover member 264 with flanged, horizontal, bottom extensions 266, and a flat base member 268 having its marginal edge portions crimped over the flanged extensions 266.

As shown in FIGS. 6, 7 and 10, open-ended windows 270 and 272, similar in size and shape, are provided in the leading inner end portions of the upper and lower members 264 and 268 of the edge light shield. An additional, auxiliary window 274, here shown somewhat smaller than either window 270 or 272, is provided in the light shield cover 264 and is spaced a definite distance outwardly from the leading inner edge 336 of a shutter portion 334 of the light shield 228. In the embodiment shown in FIGS. 6 and 10, auxiliary window 274 opens into window 270 and constitutes an outer extension of it.

As shown in FIG. 5, auxiliary light-sensitive means, generally designated 276, is carried within the inner end portion of the edge light shield 228. The means 276 comprises a prism 278 and a photo-conductive cell 280. This is the sensing part of the system for automatically controlling movement of the light shield 228 in the out to follow an edge 262 of the strip M during weaving movements and width changes. The prism 278 has an angular mirrored reflective surface 282. The prism is suitably fixed within the light shield 228 to align the mirrored surface 282 vertically beneath the auxiliary window 274, as shown in FIGS. 6, 9 and 10. The photo-conductive cell 280 is carried by the light shield 228 adjacent to and outwardly of the prism 278. By this arrangement, light shining down past the edge 262 of the strip M, and transmitted vertically through the light guide means or core 92 into the auxiliary window 274 will be reflected by the mirrored surface 282 to the photo-conductive cell 280, thereby generating an output control signal in conductors 283, 284.

As shown in FIGS. 1a and 3, the edge light shield 228 carries an angle bracket 286 having a terminal block 288. Conductors 283 and 284 from the photo-conductive cell 280 are connected, at terminal block 228, into a retractile coiled cable 300, which is anchored to a fixed terminal block 302 on the top wall 202 of the chassis 86. It will be understood that the coiled cable 300 has two conductors which may be considered merely extensions of conductors 283 and 284.

Each edge light shield means 226 and 230 has its own separate, orbitally movable traverse chain 304 trained between a drive sprocket 306 and an idler sprocket 308.

As shown in FIG. 19, the drive sprocket 306 for one edge light shield means is mounted on the same shaft 322 as the idler sprocket 308 for the other edge light shield means.

As shown in FIG. 3, the upper strand 310 of the traverse chain 304 is connected by a lug 312 to the bracket 286, thereby providing a driving connection to move the edge light shield 228 back and forth in grooves 234, 234, and along the outer, trough-like support 238, when the traverse chain 304 is driven through sprocket 306.

Suitable pressure-actuated or electrically-actuated drive means, here shown as a reversing DC motor 314, is mounted within the scanner housing 70 for each edge light shield means 226 and 230. The motor 314 has a driving sprocket 316 connected by a power chain 318 to a driven sprocket 320. As shown in FIG. 19, the driven sprocket 320 is fastened to the shaft 322 by a set screw 324. The drive sprocket 306 for the traverse chain is likewise fastened to the shaft 322, by a set screw 326. The shaft 322 is rotatably journaled within bores 330 formed in the light shield support rails 229 outwardly of the optical system housing 132. At the end of the shaft 322 opposite sprockets 306 and 320, the idler sprocket 308 is retained by a clip 332 seated in a groove in the shaft. The idler sprocket 308 is rotatably journaled on the shaft 322.

Means for Leaving Predetermined Edge Portion Unscanned

Another important part of the invention is the provision of means for leaving unscanned, a predetermined and adjustable edge portion of the strip M inwardly from its edge 262. This is useful where the edge portion may have known flaws which are to be disregarded because the edge will subsequently be trimmed off and discarded.

As shown in FIG. 5, the edge light shield means 226 has a leading, inner end portion which is adjustable relative to the auxiliary light-sensitive means 276. More specifically, a shutter 334, with a leading inner edge 336, is adjustable longitudinally within the edge light shield 228. This adjusts the spacing "s" (FIG. 5) between the leading inner edge 336 of the shutter 334 and the leading inner edge 328 of that portion of the prism 278 which is visible through the auxiliary window 274.

As will be described, adjustment of space "s" determines the width of the unscanned portion along the edge 262 of the strip M.

The shutter 334 has an outer, upturned end portion 337 with an opening through which the threaded end 338 of an adjusting rod 340 is fastened by nuts 342. The rod 340 is longitudinally slidable through a bore 344 in a block 346 secured within the edge light shield 228. A spring 348, compressed between block 346 and a head 350 on rod 340, biases the rod outwardly (that is, to the right in FIGS. 1a and 5). Another block 352 is fastened at the outer end of the edge light shield 228, and an adjusting screw 354 is threadedly engaged with it. The adjusting screw has an inner conical point 355 engaged with a conical recess 356 in the head 350. A screw driver slot 358 at the outer end of the adjusting screw 354 enables manual adjustment of the spacing "s" (FIGS. 5 and 6). Adjustment, once made, is held by a lock nut 360.

The shutter 334 is positioned beneath the prism 278 and the photo-conductive cell 280 within the edge light shield body.

Light Regulating Means for Optical System

The quantum of light entering the light pipes 142 in the detection slot 134 (FIG. 3) is regulated by angle strips 362. These are fastened to the T-rails 138 by screws 364. The angle strips 362 have horizontal flanges 366 which partly overlie the receiving end portions 144 of the light pipes 142. The space "r" between the inner edges of the flanges 366 determines the amount of light that will be transmitted by the light pipes to the photo tube 148. Because the light pipes differ in length, and the shorter ones transmit more light because they have less loss, the flanges 366 will be so formed and assembled that the space "r" between them varies proportionally with the length of the light pipes. That is, at the left end of FIG. 1, where the light pipes are longest, the spacing "r" will be greatest. Conversely, at the right end of FIG. 1A, where the light pipes are shortest, the space "r" will be the least. By carefully calibrating the space "r", a light beam of given intensity will cause the photo tube 148 to generate a signal of the same strength, regardless of the light pipe through which the light is transmitted.

Edge Light Shield Servo Circuit Control

Refer now to FIG. 21 which shows an example of a simplified servo circuit for controlling one of the reversing DC motors 314. It will be understood that these motors are separate and independent, one for each of the edge light shield means 226 and 230, and each motor will have its own control circuit.

The motor 314 is grounded through a conductor 368. It is connected by conductors 370 and 372 to FORWARD and REVERSE switches 290 and 292, respectively. Closing of the FORWARD switch rotates the motor in one direction to move the edge light shield 228 outwardly, that is, away from the edge 262 of the strip M. Closing of the REVERSE switch rotates the motor in the opposite direction to move the edge light shield 228 inwardly, that is, toward the edge 262 of strip M. When either switch is closed, the motor will be energized through conductor 374, and through a pivotable contact 376, from a source 294.

A bridge circuit, generally designated 378, is illustrated as one means of controlling the motor 314 automatically in response to the amount of light shining on the photo-conductive cell 280. It will be understood that this is shown schematically and that other control means may be employed where different sensitivities and speeds of operation are required. As shown in FIG. 21, the bridge comprises a left-hand leg and a right-hand leg in parallel between conductors 380 and 382. The left-hand leg includes the conductor 283, the photo-conductive cell 280, the conductor 284, and a conductor 384 containing a 68,000 ohm resistor, all in series. The right-hand leg includes conductors 385 and 386, respectively, containing a 2700 ohm resistor and a 50,000 ohm variable resistor, in series. A DC relay 396 having a 7950 ohm coil is connected in conductor 388 across the mid-points 390, 392, of the bridge. A broken line 394 is a schematic representation of a mechanical link between the relay 396 and the pivotable contact 376.

When the bridge is balanced, that is, when there is no appreciable flow through the conductor 388, there will be no actuation through the link 394, and both switches 290 and 292 will be in their normally open positions.

When there is excess illumination on the cell 280, as when the strip edge 262 moves inwardly exposing the cell to full illumination from the lamps 62, the point 390 will be charged positively and the resulting current flow through the relay 396 will close switch 292 and drive the motor 314 in reverse direction to move the edge light shield 228 inwardly, toward the edge 262 of the strip M.

Conversely, when the cell 280 is darkened, as by the shadow of the strip M, the point 390 will be charged negatively and the resulting current flow through the relay 296 will close switch 290 and drive the motor 314 in forward direction to move the edge light shield 228 outwardly, away from the edge 262 of the strip M.

Adjustment and Operation

Adjustment and operation of the apparatus will now be described.

As shown in FIGS. 6, 9 and 10, the prism 278 is so positioned that the leading inner portion of the mirror surface 282, adjacent the leading edge 328, is visible through the auxiliary window 274 in the top wall of the edge light shield 228.

The shutter 334 will be adjusted, by screw 354, to space its leading inner edge 336 inwardly a distance "s38 from the leading, inner edge 328 of the prism 278. This determines the width of that portion of the strip M, along the edge 262, in which flaws will be disregarded. The greater the spacing "s"; the greater will be the width of the uninspected portion along the edge 262 of strip M. Because of this novel arrangement enabling the ready adjustment of the spacing "s", and the novel arrangement of the light discriminating means 90, the unscanned width can be regulated quite precisely to as little as a few hundredths of an inch. This is extremely important where trimmed, straight-edged, finished strip is inspected completely from one edge to the other.

By adjusting the 50,000 ohm resistor in conductor 386, the bridge circuit 378 can be balanced, with no significant current flowing in either direction through the coil of relay 396, when the edge 262 of strip M is vertically aligned with a midportion of the edge light shield auxiliary window 274. The shadow of edge 262 of the strip M is indicated in broken lines in FIG. 6, substantially bisecting the auxiliary window 274. This is just one example of a normal, balanced position which the motor 314 would automatically seek to maintain, under control of the circuit 378.

If the edge 262 moves from the normal operating position shown in FIG. 6, either in a direction to decrease or increase light transmitted to the cell 280, the resulting unbalanced condition in the bridge 378 will energize the motor to move the light shield in a direction to restore its balanced condition corresponding to the relationship between the strip edge 262 and the window 274 shown in FIG. 6.

The circuit is failsafe. If the light source fails, or if the light transmission through the guide means 90 is impaired by dirt, scale, or for some other reason, the motor 314 moves the light shield 228 outwardly, not inwardly. If there is a serious malfunctioning in the light-transmission system, the resulting outward movement of the light shield will permit light to leak past the edge of the strip M into the optical system 84, at which time the circuit shown in FIG. 11 will shut down the main photo tube 148, protecting it from damage.

In normal operation, with the edge light shield means 226 on one side and the edge light shield means 230 on the other side, each independently following an edge of the strip M, any pinholes between the leading inner edges 336 of the shutters 334 will cause the optical system 84 to generate a flaw signal in output conductor 168 for identifying a flaw or for rejecting the strip M in the manner described.

It will be apparent that the embodiments shown are exemplary only and that various modifications can be made in construction and arrangement within the scope of the invention as defined in the appended claims.

I claim:

1. Inspection apparatus for detecting pinholes in a strip of material having a frame providing a path of movement for a strip of material and having a light source and a scanner housing on opposite sides of said path, the combination of:

an elongated light guide aperture in a wall of said scanner housing, said aperture being disposed in a direction transverse to said path of movement and in a position to receive light from said light source;

light guide means in said aperture effective to transmit light from said source only in planes which are substantially parallel to said path of movement and substantially normal to said strip;

a light-sensitive optical system having light receiving means within said scanner housing in spaced, parallel alignment with said light guide means and effective to generate an output signal in response to sensing of light from said source through a hole in said strip;

an edge light shield between said light guide means and said light receiving means within said scanner housing and transversely movable with respect to said path of movement;

reversible driving means carried by said frame and connected to move said edge light shield;

power means for said driving means;

auxiliary light-sensitive means carried by said edge light shield proximate to an edge of said strip in position to receive light from said light source past said edge of said strip;

and a control circuit including said auxiliary light-sensitive means controlling energization of said driving means by said power means to move said edge light shield in response to variations in light intensity sensed by said auxiliary light-sensitive means.

2. Inspection apparatus according to claim 1, wherein: said light guide means comprises a plurality of light-transmitting channels substantially parallel to said path of movement and normal to said strip.

3. Inspection apparatus according to claim 2, wherein: said light-transmitting channels are relatively narrow in a direction transverse to said path of movement and relatively wide in a direction parallel to said path of movement and in a direction normal to said strip.

4. Inspection apparatus according to claim 2, wherein: said light-transmitting channels are defined by a plurality of louvers parallel to said path of movement and spaced apart in a direction transverse to said path of movement.

5. Inspection apparatus according to claim 4, wherein:

light-transmitting material is interposed between said louvers.

6. Inspection apparatus according to claim 1, wherein: said light guide means comprises optical means for transmitting light in substantially parallel directions from said light source to said light receiving means within said scanner housing.

7. Inspection apparatus according to claim 1, wherein: said light guide means comprises a plurality of light-transmitting channels substantially parallel to one another and normal to said strip.

8. Inspection apparatus according to claim 1, wherein:

said light guide means comprises a plurality of laminations of light-transmitting material substantially parallel to said path of movement and normal to said strip.

9. Inspection apparatus according to claim 1, wherein: said edge light shield has a leading, inner edge which is adjustable relative to said auxiliary light-sensitive means to selectively vary the spacing therebetween in a direction transverse to said path of movement.

10. Inspection apparatus according to claim 9, including:
means accessible from the exterior of said scanner housing to adjust said spacing between said leading, inner edge and said auxiliary light-sensitive means.

11. Inspection apparatus according to claim 1, including:
guide means within said scanner housing; said guide means supporting said edge light shield for transverse movement relative to said path of movement.

12. Inspection apparatus according to claim 1, wherein:
said edge light shield is elongated in the direction of movement thereof;
a shutter is mounted at the leading inner end portion of said edge light shield and is relatively movable therein;
said shutter has a leading, inner edge portion extending inward beyond said auxiliary light-sensitive means; and
means for adjustably moving said shutter along said edge light shield to vary the spacing between said leading inner edge of said shutter and said auxiliary light-sensitive means.

13. Inspection apparatus according to claim 1, wherein:
said strip has a normal operating position relative to said edge light shield in which
 a. a leading inner end portion of said edge light shield laps said edge of said strip;
 b. a light-receiving portion of said auxiliary light-sensitive means is partially shaded from said light source by said strip; and
 c. said control circuit is in a balanced condition and ineffective to energize said driving means to move said edge light shield; and
movement of said edge of said strip from said normal operating position unbalances said control circuit in response to change in light level on said auxiliary light-sensitive means and energizes said driving means to move said edge light shield relative to said edge of said strip in a direction to restore said normal operating position.

14. Inspection apparatus according to claim 1, wherein:
said edge light shield has a cover between said light source and a light-receiving portion of said auxiliary light-sensitive means;
said cover has a window spaced a predetermined distance outwardly from a leading, inner end portion of said edge light shield; and
said light-receiving portion of said auxiliary light-sensitive means is aligned with said window for receiving light from said light source through said light guide means.

15. Inspection apparatus according to claim 1, wherein:

said edge light shield has a hollow body with spaced cover and base walls parallel to said strip and elongated in the direction of movement of said edge light shield;
said edge light shield has a pair of open-ended windows in the leading, inner end portions of said walls, said windows being aligned in a direction normal to said strip and being positioned inwardly of a light-receiving portion of said auxiliary light-sensitive means;
a shutter is supported for longitudinal movement within said body and has a leading, inner edge portion movable in the space between said windows to vary the light-transmitting opening through said windows; and
means for adjustably moving said shutter longitudinally of said body to vary the spacing between said leading inner edge portion of said shutter and said light-receiving portion of said auxiliary light-sensitive means while coincidentally varying said light-transmitting opening through said windows.

16. Inspection apparatus according to claim 15, wherein:
said cover wall of said edge light shield has an auxiliary window outwardly of, and adjacent to, said window in said cover wall; and
said light-receiving portion of said auxiliary light-sensitive means is positioned to receive light through said auxiliary window.

17. In inspection apparatus for detecting pinholes in a strip of material having a frame providing a path of movement for a planar strip of material and having a light source on one side of said path extending transversely across said path to illuminate the width of said strip, a scanner housing on the other side of said path having an aperture extending transversely to the direction of movement of said strip, light-sensitive means within said housing effective to generate an output signal in response to sensing of light from said source through a hole in said strip and through said aperture; improved means for preventing light from passing around an edge of said strip and impinging upon said light-sensitive means comprising:
 a. light guide means aligned with said aperture effective to transmit light from said light source only in planes which are substantially parallel to said path and substantially normal to said strip;
 b. elongated edge light shield means within said scanner housing between said aperture and said light-sensitive means, in position to prevent the transmission of light through an outer end portion of said aperture to said light-sensitive means,
  i. said edge light shield means having a leading inner end portion adapted to assume a lapped position relative to said edge of said strip, and
  ii. said edge light shield means being movable lengthwise of said aperture to maintain said lapped position during transverse movement of said edge of said strip;
 c. auxiliary light-sensitive means within said scanner housing positioned to receive light transmitted through said light guide means;
 d. said auxiliary light-sensitive means being supported for movement with said edge light shield means;

e. said edge light shield means and said auxiliary light-sensitive means being movable relative to said edge of said strip to a normal operating position wherein said leading inner end portion of said edge light shield means and said auxiliary light-sensitive means are in predetermined positions relative to said edge of said strip;

f. signal generating means associated with said auxiliary light-sensitive means effective to generate an output signal in response to movement of said edge of said strip, relative to said edge light shield means and said auxiliary light-sensitive means, from said normal operating position;

g. drive means effective to move said edge light shield means and auxiliary light-sensitive means simultaneously inwardly or outwardly lengthwise of said aperture; and h. control means operatively connected with said drive means to move said edge light shield means and auxiliary light-sensitive means toward said normal operating position in response to said output signal.

18. In inspection apparatus according to claim 17 wherein:
in said normal operating position, said leading inner end portion of said edge light shield means laps said edge of said strip to a predetermined extent; and
at least a portion of said auxiliary light-sensitive means is positioned to receive light from said light source through said light guide means.

19. In inspection apparatus according to claim 17, wherein:
said edge light shield means comprises an elongated body connected with said drive means for movement lengthwise of said aperture;
said leading end portion of said edge light shield means comprises a shutter carried by said body at the inner end portion thereof; and
said shutter is adjustable to vary its position lengthwise of said body.

20. In inspection apparatus according to claim 19, wherein:
said auxiliary light-sensitive means is carried by said body; and
adjustment of said shutter varies the spacing between said auxiliary light-sensitive means and the leading inner end portion of said shutter, to correspondingly vary the extent of lap of said leading inner end portion of said shutter relative to said edge of said strip in said normal operating position.

21. In inspection apparatus according to claim 17, wherein:
said auxiliary light-sensitive means is supported on said edge light shield means at a predetermined spacing outwardly from said leading inner end portion of said edge light shield means; and
means is provided for adjusting said spacing.

22. In inspection apparatus according to claim 17, wherein:
said auxiliary light-sensitive means includes a light-reflecting element and a photo-sensitive element supported by and movable with said edge light shield means; and
said light-reflecting element is oriented to reflect light from said light source to said photo-sensitive element.

23. In inspection apparatus according to claim 22, wherein:
said leading inner end portion of said edge light shield means comprises a shutter having an inner end extending inwardly beyond said light-reflecting element, and means for adjusting the relative spacing between said inner end of said shutter and said light-reflecting element.

24. In inspection apparatus for detecting pinholes in a strip of material moving along a path in a horizontal plane, said inspection apparatus having a light source above said path and extending across the width of said strip, a scanner housing below said path having an elongated aperture adjacent said path and extending transversely relative to said path, light-sensitive means within said housing effective to generate an output signal in response to sensing of light from said source through a hole in said strip and through said aperture; improved means for preventing light from passing around an edge of said strip and impinging upon said light-sensitive means, comprising:

a. light guide means in said aperture effective to transmit light from said light source only in a plane which is substantially upright and substantially parallel to the line of travel of said strip;

b. an opaque edge light shield positioned inside said scanner housing between said light guide means and said light-sensitive means, said edge light shield having an elongated body wider than said aperture and underlying same and having a leading inner edge portion adapted to extend inward beyond a vertical plane containing said edge of said strip to thereby block the passage of light through an end of said aperture to said light-sensitive means;

c. an auxiliary light-sensitive element positioned inside said scanner housing between said light guide means and said edge light shield;

d. means for moving said edge light shield and said auxiliary light-sensitive element simultaneously back and forth along the length of said aperture while maintaining said leading inner edge portion of said edge light shield spaced a predetermined distance inwardly of said auxiliary light-sensitive element;

e. said leading inner edge portion of said edge light shield and said auxiliary light-sensitive element being movable to a normal operating position wherein they are respectively inside and outside of said vertical plane containing said edge of said strip, and wherein, further, said edge light shield blocks the passage of light around the edge of said strip through said aperture;

f. signal generating means effective to generate an output signal in response to displacement of said edge of said strip from its said normal operating position relative to said leading inner edge portion and said auxiliary light-sensitive element;

g. drive means effective to move said edge light shield and said auxiliary light-sensitive element back and forth longitudinally along said aperture; and h. control means operatively connected with said drive means to move said edge light shield and said auxiliary light-sensitive element toward said normal operating position in response to said output signal.

* * * * *

PO-1050
(5/69)

UNITED STATES PATENT OFFICE
CERTIFICATE OF CORRECTION

Patent No. 3,697,758   Dated October 10, 1972

Inventor(s) Melvin J. Binks

It is certified that error appears in the above-identified patent and that said Letters Patent are hereby corrected as shown below:

In the specification:
Col. 1, between lines numbered 61 and 62, insert paragraph --It is a further object of this invention to provide, for a pinhole detector, novel light shielding means which is sealed away from the ambient atmosphere.--; line numbered 62, delete "It is a further" and substitute --Yet another--.
Col. 4, line 24, after "of" insert --T-rails 138. These are fastened to the optical system housing--.
Col. 5, lines 14 and 15, delete "Each photo cell 172, will cause a response."; line 55, change "98" to --198--.
Col. 6, line 66, change "sore" to --core--.
Col. 8, line 16, change "the out" to --and out--;

Col. 11, line 5, " "s38 " should be --"s"--; line 8, after "s" change the semi-colon (;) to a comma (,).

In the Claims:
Col. 13, line 26, "therein" should be --thereon--.

Signed and sealed this 10th day of April 1973.

(SEAL)
Attest:

EDWARD M. FLETCHER, JR.
Attesting Officer

ROBERT GOTTSCHALK
Commissioner of Patents